(12) United States Patent
Sheidler et al.

(10) Patent No.: US 8,074,433 B2
(45) Date of Patent: *Dec. 13, 2011

(54) AGRICULTURAL HARVESTER WITH AUXILIARY POWER UNIT AND INTELLIGENT POWER MANAGEMENT

(75) Inventors: Alan Sheidler, Moline, IL (US); Benjamin E. Ramp, Geneseo, IL (US)

(73) Assignee: Deere & Company, Moline, IL (US)

( * ) Notice: Subject to any disclaimer, the term of this patent is extended or adjusted under 35 U.S.C. 154(b) by 770 days.

This patent is subject to a terminal disclaimer.

(21) Appl. No.: 12/048,457

(22) Filed: Mar. 14, 2008

(65) Prior Publication Data

US 2009/0233664 A1 Sep. 17, 2009

(51) Int. Cl.
*A01D 34/00* (2006.01)
(52) U.S. Cl. .................. 56/10.7; 460/6; 701/50
(58) Field of Classification Search .......... 56/10.2 R, 56/10.6, 10.7, 13.5–13.8; 460/6; 60/698; 701/50
See application file for complete search history.

(56) References Cited

U.S. PATENT DOCUMENTS

| | | | | |
|---|---|---|---|---|
| 2,689,621 A * | 9/1954 | Donley | | 180/53.1 |
| 3,093,946 A * | 6/1963 | Pitt et al. | | 460/6 |
| 3,260,041 A * | 7/1966 | McRoberts et al. | | 56/119 |
| 3,514,929 A * | 6/1970 | Cornish et al. | | 460/6 |
| 3,583,405 A * | 6/1971 | Gerhardt et al. | | 460/1 |
| 3,669,123 A | 6/1972 | Gaeddert et al. | | |
| 3,690,395 A | 9/1972 | Spiller et al. | | |
| 4,131,170 A * | 12/1978 | van der Lely | | 180/22 |
| 4,448,157 A * | 5/1984 | Eckstein et al. | | 123/142.5 R |
| 5,488,817 A * | 2/1996 | Paquet et al. | | 56/10.2 R |
| 5,794,422 A * | 8/1998 | Reimers et al. | | 56/11.9 |
| 5,995,895 A * | 11/1999 | Watt et al. | | 701/50 |
| 6,474,068 B1 * | 11/2002 | Abdel Jalil et al. | | 60/716 |
| 6,745,117 B1 * | 6/2004 | Thacher et al. | | 701/50 |
| 2002/0056262 A1* | 5/2002 | Favache | | 56/16.4 A |
| 2005/0079949 A1* | 4/2005 | Suzuki | | 477/2 |
| 2008/0248843 A1 | 10/2008 | Birrell et al. | | |

FOREIGN PATENT DOCUMENTS

| | | |
|---|---|---|
| EP | 1640201 A | 3/2006 |
| EP | 2100787 A | 9/2009 |
| GB | 709777 A | 6/1954 |
| JP | 57076263 A * | 5/1982 |
| JP | 2004242558 A | 9/2004 |

OTHER PUBLICATIONS

European Search Report dated Dec. 2, 2009 (5 pages).
Stuart Birrel, Dan Frohberg and Mark Hanna; article entitled "Biomass Harvest and Densification"; published by Iowa State University in 2004; article available at http://www.ag.iastate.edu/farms/04reports/central/BiomassHarvest.pdf (2 pages).

* cited by examiner

*Primary Examiner* — Thomas Will
*Assistant Examiner* — Joan Misa
(74) *Attorney, Agent, or Firm* — Taylor IP, P.C.

(57) ABSTRACT

An agricultural harvester includes a primary power unit which is couplable with at least one primary load. The at least one primary load includes a threshing system load. An auxiliary power unit is mechanically independent from the primary power unit, and is couplable with at least one biomass processor, independent from the threshing system load.

15 Claims, 2 Drawing Sheets

AGRICULTURAL HARVESTER WITH AUXILIARY POWER UNIT AND INTELLIGENT POWER MANAGEMENT

FIELD OF THE INVENTION

The present invention relates to agricultural harvesters, and, more particularly, to harvesters including an internal combustion engine which may be used to drive primary and external loads.

BACKGROUND OF THE INVENTION

A work machine, such as an agricultural work machine, a construction work machine or a forestry work machine, typically includes a power unit in the form of an internal combustion (IC) engine. The IC engine may either be in the form of a compression ignition engine (i.e., diesel engine) or a spark ignition engine (i.e., gasoline engine). For most heavy work machines, the power unit is in the form of a diesel engine having better lugging, pull-down and torque characteristics for associated work operations.

The step load response of an IC engine in transient after a load impact is a feature mostly influenced by the engine displacement, the hardware of the engine (e.g., whether it has a standard turbocharger, a turbocharger with waste gate or variable geometry, etc.), and by the software strategy for driving the air and fuel actuators (e.g., exhaust gas recirculation, turbocharger with variable geometry turbine (VGT), fuel injector configuration, etc.) with respect to the requirements of emissions legislation (e.g., visible smoke, nitrous oxides (NOx), etc.), noise or vibrations. The load impact may be the result of a drivetrain load (e.g., an implement towed behind the work machine) or an external load (i.e., a non-drivetrain load). External loads can be classified as including both parasitic and auxiliary loads. Parasitic loads are non-drivetrain loads placed upon an engine through normal operation of the work machine, without operator intervention (e.g., an engine cooling fan, hydraulic oil cooling circuit pump, etc.). Auxiliary loads are non-drivetrain loads placed upon an engine through selective operator intervention (e.g., an auxiliary hydraulic load such as an unloading auger on a combine, a front end loader, a backhoe attachment, etc.)

Engine systems as a whole react in a linear manner during the application of a transient load. Initially, the load is applied to the drive shaft of the IC engine. The IC engine speed decreases when the load increases. The engine speed drop is influenced by whether the governor is isochronous or has a speed droop. The air flow is increased to provide additional air to the IC engine by modifying the air actuators. A time delay is necessary to achieve the new air flow set point. The fuel injection quantity, which is nearly immediate, is increased with respect to both the smoke limit and maximum allowable fuel quantity. The engine then recovers to the engine speed set point. The parameters associated with an engine step load response in transient after a load impact are the speed drop and the time to recover to the engine set point.

An IC engine may be coupled with an infinitely variable transmission (IVT) which provides continuous variable output speed from 0 to maximum in a stepless fashion. An IVT typically includes hydrostatic and mechanical gearing components. The hydrostatic components convert rotating shaft power to hydraulic flow and vice versa. The power flow through an IVT can be through the hydrostatic components only, through the mechanical components only, or through a combination of both depending on the design and output speed.

A work machine including an IC engine coupled with an IVT may exhibit problems to be overcome in two ways: First, sudden loads placed on the drivetrain or vehicle hydraulic functions cause the engine speed to decrease. The response time to change the IVT ratio to reduce engine load once decreased is slower than necessary to prevent substantial engine speed drop and sometimes stall. Second, when an external load is applied to the IC engine, such as when filling the bucket of a front end loader on an IVT vehicle, the operator may command a vehicle speed substantially more than what is capable from the IC engine. Under these conditions the IVT output torque and speed may result in excessive wheel slippage and other undesirable characteristics. Likewise, if an external load from another external function to the transmission is activated, such as hydraulic functions, the external load combined with the transmission output capability may place the engine in an overload condition.

The demands for increased performance and fuel economy will increase significantly for farm machinery within the next decade. For combines, the need to improve productivity will be compounded by the addition of other functional capabilities beyond merely the threshing and cleaning of grain. The advent of attachments for biomass collection, stalk chopping for residue management and fine cut straw choppers are some examples of using the combine to not only collect grain, but to also collect residue for ethanol refining or chop up residue for better reincorporation of plant nutrients in the soil. These functions require significant amounts of engine power beyond the traditional harvesting function. Because levels of engine output in the tier 4 (T4) timeframe will be limited, other ways of delivering increased performance, features and fuel economy will be required in order to provide adequate power for these additional functions.

Currently, for cornheads with integral stalk chopping capability, a higher horsepower torque curve is automatically selected by the engine control unit (ECU). This causes the IC engine to generate more power to offset the increased power demand to enable the stalk chopping function. This is called "intelligent power management" or IPM. Essentially, the engine power output is automatically controlled to deliver just the amount needed to meet the load as a function of all of the various threshing, propulsion, and residue chopping required. IPM enables the operator to configure the combine with the appropriate header either with or without stalk chopping and the powertrain automatically selects the proper torque curve to provide enough power to provide consistent, predictable performance and for good fuel economy. A higher power output can be selected for high power needs or a lower curve for non-chopping situations, without noticeable differences in machine throughput capability. Fuel consumption can be saved with the lower curve, if the operator is not chopping.

The basic problem is that the power output of currently available IC engines is limited. As combines get larger and as additional functions such as biomass collection are added, there will not be enough power from the IC engine and a higher torque curve cannot be selected as a result. Invariably, combine performance will be limited in this situation.

What is needed in the art is an agricultural harvester and corresponding method of operation providing sustained, increased power capability for carrying out additional functions during a harvesting operation.

SUMMARY OF THE INVENTION

The invention in one form is directed to an agricultural harvester, including a primary power unit which is couplable with at least one primary load. The at least one primary load includes a threshing system load. An auxiliary power unit is mechanically independent from the primary power unit, and is couplable with at least one biomass processor, independent from the threshing system load.

The invention in another form is directed to a method of operating an agricultural harvester, including the steps of: driving a threshing system load with a primary power unit; and driving a biomass processor with an auxiliary power unit, independent from the threshing system load.

DETAILED DESCRIPTION OF THE INVENTION

Figure 1A:
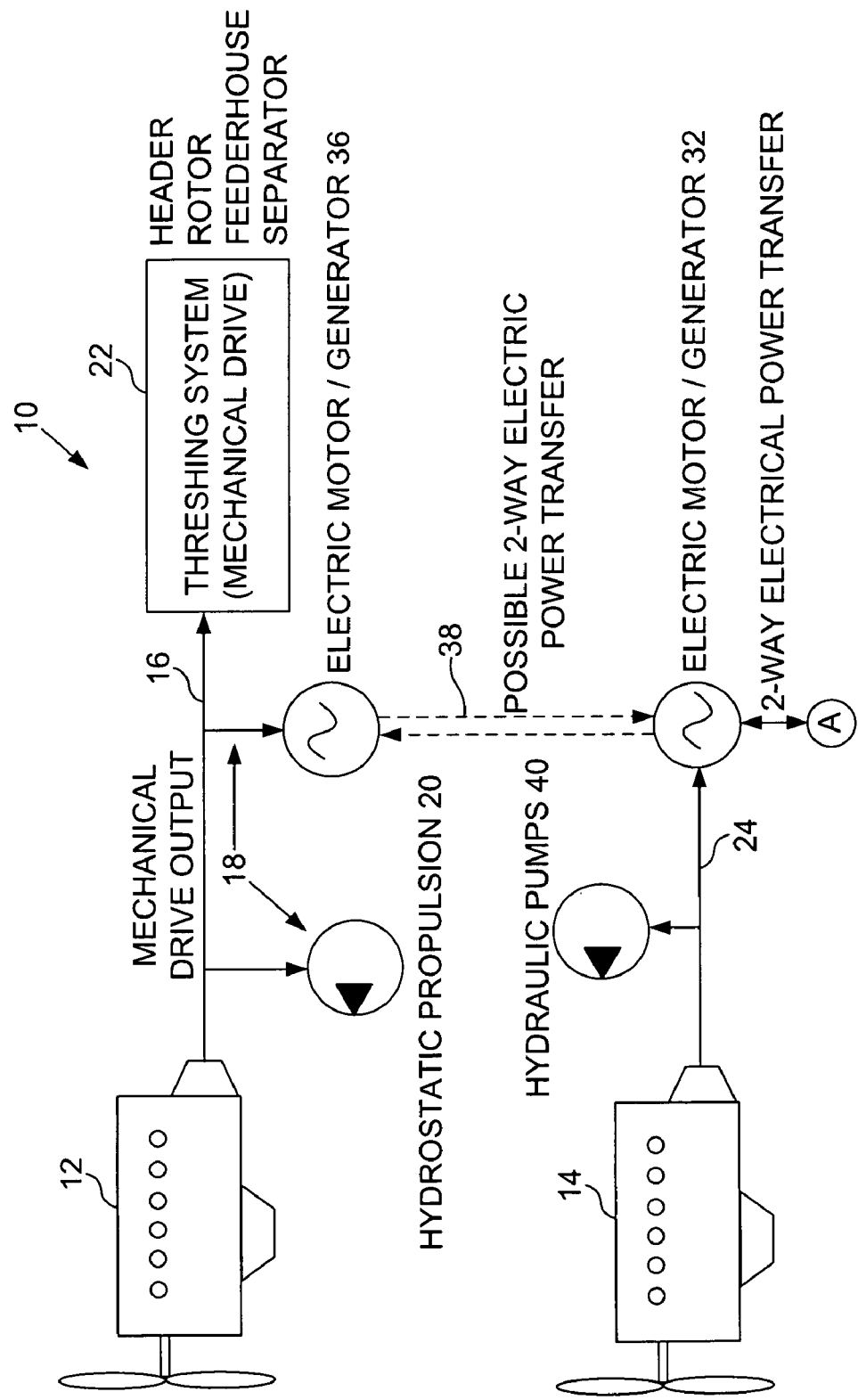
FIGS. 1A and 1B are a schematic illustration of one embodiment of an agricultural harvester of the present invention in the form of an agricultural combine.

Referring now to FIG. 1, there is shown a schematic illustration of an embodiment of an agricultural harvester 10 of the present invention. Harvester 10 is assumed to be a John Deere agricultural combine, but could be a different type of harvester.

Harvester 10 includes a primary power unit in the form of a primary IC engine 12, and an auxiliary power unit in the form of an auxiliary IC engine 14. Primary IC engine 12 and auxiliary IC engine 14 are each assumed to be a diesel engine in the illustrated embodiment, but could also be a gasoline engine, propane engine, etc.

Primary IC engine 12 has a primary drivetrain, typically including an output crankshaft 16, with a rated primary output which drives one or more primary loads 18. The primary load(s) driven by primary IC engine 12 include two types of drivetrain driven loads; namely, loads associated with the hydrostatic propulsion 20 and loads associated with the threshing system 22.

For propelling harvester 10, an IVT 20 in the form of a hydrostatic transmission may be selectively engaged/disengaged with crankshaft 16, and provides motive force to one or more drive wheels (not shown). Of course, it will be appreciated that in the case of a track-type work vehicle, crankshaft 16 may be coupled with a ground engaging track.

The threshing system loads in general are drivetrain loads associated with separation and cleaning of the crop into grain and non-grain crop material. The threshing system loads are generally high power consumption loads associated with one or more of the following: a cutting platform; a header; a feederhousing; a rotor; and a separator.

Auxiliary IC engine 14 is mechanically independent from primary IC engine 12. Auxiliary IC engine 14 has an auxiliary drivetrain, typically including an output crankshaft 24, for driving a number of external loads, including one or more biomass processors 26. Auxiliary IC engine 14 is sized with a rated auxiliary output which is the same as or smaller than the rated output of primary IC engine 12. In the embodiment shown, auxiliary IC engine 14 is assumed to have a rated auxiliary output which is less than the rated primary output of primary IC engine 12. In particular, primary IC engine 12 is assumed to be a 13.5 L engine with a rated output of 425 kW, and auxiliary IC engine 14 is assumed to be a 2.4 L engine with a rated output of 56 kW.

Auxiliary IC engine 14 drives one or more external loads, which includes one or more auxiliary loads 28, and may include one or more parasitic loads. Parasitic loads are non-drivetrain loads placed upon auxiliary IC engine 14 through normal operation of the harvester, without operator intervention (e.g., an electrically driven engine cooling fan associated with primary IC engine 12, etc.).

Figure 1B:
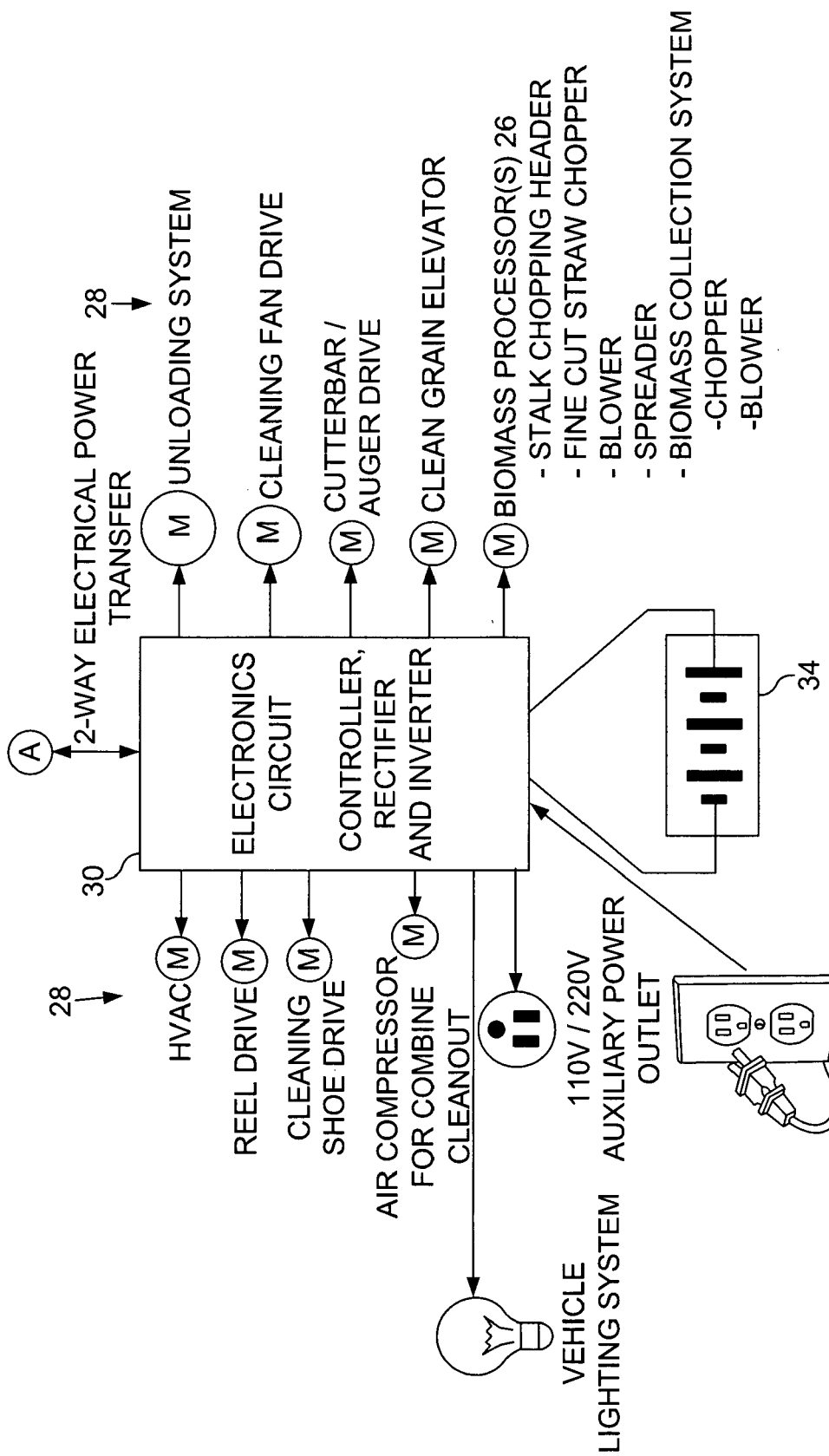

Auxiliary loads 28 are non-drivetrain hydraulic or electric loads placed upon auxiliary IC engine 14 through selective operator intervention. In the embodiment of FIGS. 1A and 1B, the auxiliary loads 28 other than the biomass processor loads are associated with one or more of the following: a heating and air conditioning system; a reel drive; a cleaning shoe drive; an air compressor for cleanout function; a vehicle lighting system; a clean grain unloading system; a cleaning fan drive; a cutterbar/auger drive; a clean grain elevator; and an auxiliary electrical power outlet.

All of these auxiliary loads 28 (except the lighting system and auxiliary electrical power outlet) are indicated as being electrically driven loads, powered by respective electric motors (each designated "M", but not specifically numbered). The various motors M are selectively energized using electronics circuit 30 (shown schematically in block form), which may include a controller, a rectifier and a DC-to-AC inverter. Electronics circuit 30 electrically couples an auxiliary motor/generator 32 with a motor M associated with a selected auxiliary load 28. When providing electrical power to one or more auxiliary loads 28, it will be appreciated that auxiliary motor/generator 32 is operated as a motor/generator with an electric power output. The auxiliary loads can also include one or more operator initiated hydraulic loads, represented by hydraulic pumps 40.

Although not specifically shown, the controller within electronics circuit 30 may include a first engine control unit (ECU) associated with operation of primary IC engine 12, and a second ECU associated with operation of auxiliary IC engine 14. It will also be appreciated that a common ECU may be provided for controlling operation of each of primary IC engine 12 and auxiliary IC engine 14. Electronics circuit 30 may also include a transmission control unit (TCU) for controlling operation of IVT 20, and a vehicle control unit (VCU) for receiving operator input commands and controlling operation of the various auxiliary loads 28.

Biomass processor(s) 26 are used to process the non-grain crop material for returning to the field in a desired state, or for downstream use such as ethanol production or livestock feed. Biomass processor(s) 26 may be used to chop or grind the non-grain crop material to a desired consistency, spread the non-grain crop material back to the field, or transfer the non-grain crop material to a wagon or the like for transport from the field.

For example, a fine cut straw chopper mounted on the rear of a combine typically includes an integral chopper, blower and spreader for returning the non-grain crop material to the field. The chopper includes a rotor positioned within a housing. The rotor carries radially extending knives which rotate past stationary knives extending radially inward from the housing. The extent to which the non-grain crop material is chopped is adjusted by moving the stationary knives radially inward or outward within the housing. The chopper can be bypassed by simply moving the stationary knives to a position outside the housing, and using the rotating blades primarily as a blower.

As another example, a corn header at the front of the combine may be equipped with a stalk chopper for chopping the corn stalks prior to being returned to the field. An example of a chopping header is the Model No. 612C corn header manufactured by the assignee of the present invention. Basically, a rotating blade is positioned below the stripper rolls for each row. The rotating blade chops the stalks as they are stripped through the stripper rolls. The rotating blades are commonly driven from interconnected gearboxes and shafts.

As yet another example, it is possible to equip a combine with a biomass collection system at the rear of the combine for conveying the non-grain crop material to a wagon or the like, and subsequent transport to offsite facilities (e.g., ethanol plant or livestock feedlot). Such a unit may be equipped similar to a silage chopper and blower arrangement, except carried at the rear of the combine. An example of such a biomass collection system has been built and tested by Iowa State University, and mounted to a John Deere 9750 STS base unit with a 653A whole crop header that collects the entire plant. See, e.g., the article entitled "Biomass Harvest and Densification" published at the website http://www.ag.iastate.edu/farms/04reports/central/BiomassHarvest.pdf.

In the event that auxiliary IC engine 14 is not operating and electrical power is required for temporary powering of one or more biomass processors 26 or auxiliary loads 28, an electrical storage battery 34 is also coupled with electronics circuit 30. Of course, a bank of batteries can be electrically connected together for a higher amp*hour rating. The power from battery 34 can be applied as DC power, or inverted and applied as AC power.

With any biomass processor as described above, the power requirements can be substantial. According to an aspect of the present invention, the auxiliary IC engine 14 is used to drive the biomass processor(s) such that these loads do not put the primary IC engine 12 in an overload operating condition. The biomass processors 26, as well as the other auxiliary loads 28, may be electrically or hydraulically driven loads, and are controlled using electronics circuit 30. The biomass processors can be hardwired to the electronics circuit 30, auxiliary motor/generator 32 and/or battery 34, or alternatively may be coupled using modular connectors or plugs (e.g., one or more of the electrical plug-in outlets shown in FIG. 1A).

Further, the biomass processors may be driven at the same or a different operating speed than the primary IC engine 12. This allows the biomass processing functions to be at a different speed than the threshing and propulsion functions, which can be important for certain operating conditions such as tougher crop material when approaching dusk, etc.

According to another aspect of the present invention, primary IC engine 12 may be coupled with a primary motor/generator 36. Primary motor/generator 36 and auxiliary motor/generator 32 are electrically coupled together, as indicated by electric power lines 38. This allows intelligent power management (IPM) by splitting the power needs between primary IC engine 12 and auxiliary IC engine 14. Electric power can be transferred from primary motor/generator 36 to auxiliary motor/generator 32, or vice versa, depending upon the power needs associated with primary loads 18 or external loads 28.

In the embodiment shown and described above, the primary IC engine 12 directly drives only the propulsion loads and the threshing system loads. The auxiliary IC engine 14 drives the external loads, including the biomass processors 26 and the other auxiliary loads 28. However, depending upon how the IC engines 12 and 14 are sized and configured, it may be desirable to drive at least some of the external loads other than the biomass processors using primary IC engine 12. Additionally, it may be desirable for certain applications to drive one or more of the biomass processors using primary IC engine 12. In any event, enough of the biomass processors 26, and optionally other auxiliary loads 28, are driven by auxiliary IC engine 14 such that primary IC engine 12 is not placed in an overload condition during operation.

Having described the preferred embodiment, it will become apparent that various modifications can be made without departing from the scope of the invention as defined in the accompanying claims.

The invention claimed is:

1. An agricultural harvester, comprising:
   a primary power unit being coupleable with at least one primary load, said at least one primary load including a threshing system load; and
   an auxiliary power unit which is mechanically independent from said primary power unit, said auxiliary power unit being coupleable with at least one biomass processor, independent from said threshing system load;
   a primary motor and generator mechanically coupled with said primary power unit;
   an auxiliary motor and generator mechanically coupled with said auxiliary power unit, said auxiliary motor and generator being configured to electrically drive said at least one biomass processor; and
   wherein said primary motor and generator and said auxiliary motor and generator are electrically coupled together for 2-way electrical power transfer.

2. The agricultural harvester of claim 1, wherein said agricultural harvester is an agricultural combine, and said threshing system load corresponds to at least one of:
   a cutting platform;
   a header;
   a feederhousing;
   a rotor; and
   a separator.

3. The agricultural harvester of claim 1, wherein said at least one primary load includes a propulsion load.

4. The agricultural harvester of claim 1, wherein said primary power unit includes a primary drive train, and said auxiliary power unit includes an auxiliary drive train, each of said at least one primary load being driven by said primary drive train, and each of said at least one biomass processor being driven by said auxiliary drive train.

5. The agricultural harvester of claim 1, wherein said agricultural harvester is an agricultural combine, and said biomass processor corresponds to at least one of:
   a stalk chopper on a cornhead;
   a fine cut straw chopper;
   a blower;
   a spreader; and
   a biomass collection system.

6. The agricultural harvester of claim 5, wherein said biomass collection system includes an integral chopper and a blower.

7. The agricultural harvester of claim 1, wherein said primary power unit has a rated primary output, and said auxiliary power unit has a rated auxiliary output which is smaller than said rated primary output.

8. The agricultural harvester of claim 1, wherein said primary power unit is a primary internal combustion (IC) engine, and said auxiliary power unit is an auxiliary IC engine.

9. The agricultural harvester of claim 1, including at least one electrical processing circuit configured for selectively coupling said primary power unit with at least one said primary load, and for selectively coupling said auxiliary power unit with at least one said biomass processor.

10. The agricultural harvester of claim 1, wherein said auxiliary power unit is coupleable with at least one external load, said at least one external load including an operator initiated load.

11. A method of operating an agricultural harvester, comprising the steps of:

driving a threshing system load with a primary power unit;
driving a biomass processor with an auxiliary power unit, independent from said threshing system load, said auxiliary power unit being mechanically independent from said primary power unit in;
wherein a primary motor and generator is mechanically coupled with said primary power unit;
an auxiliary motor and generator is mechanically coupled with said auxiliary power unit, said auxiliary motor and generator being configured to electrically drive said at least one biomass processor; and
wherein said primary motor and generator and said auxiliary motor and generator are electrically coupled together for 2-way electrical power transfer.

12. The method of operating a harvester of claim 11, wherein said agricultural harvester is an agricultural combine, and said biomass processor corresponds to at least one of:
a stalk chopper on a cornhead;
a fine cut straw chopper;
a blower;
a spreader; and
a biomass collection system.

13. The method of operating a harvester of claim 12, wherein said biomass collection system includes an integral chopper and a blower.

14. The method of operating a harvester of claim 11, wherein said agricultural harvester is an agricultural combine, and said threshing system load corresponds to at least one of:
a cutting platform;
a header;
a feederhousing;
a rotor; and
a separator.

15. The method of operating a harvester of claim 11, wherein said at least one primary load includes a propulsion load.

* * * * *